Nov. 28, 1967  E. A. SWEE  3,355,582
BATTERY POWERED LIGHTING DEVICE
Filed Sept. 3, 1965
FIG. 1.
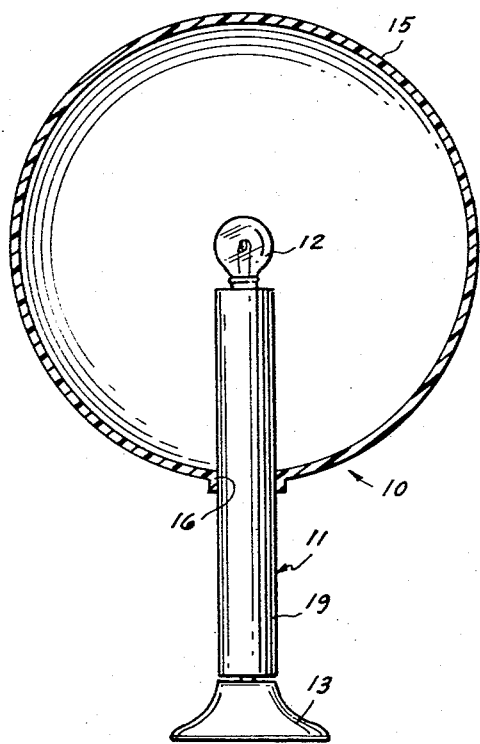
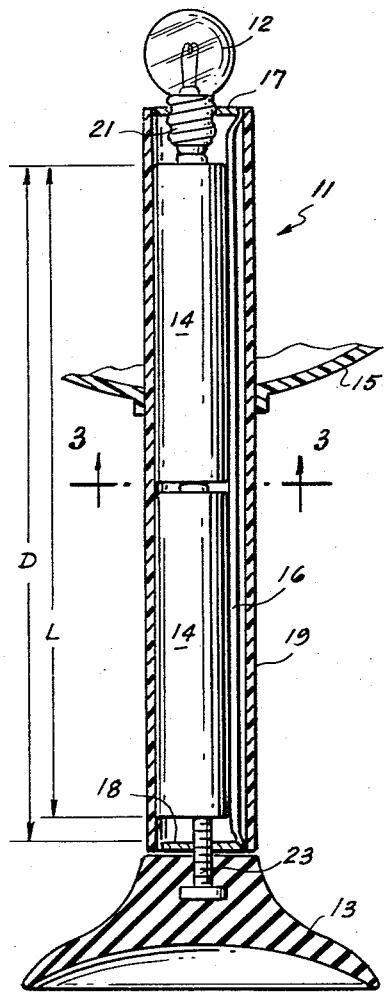
FIG. 2.
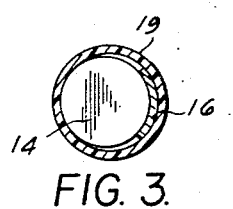
FIG. 3.
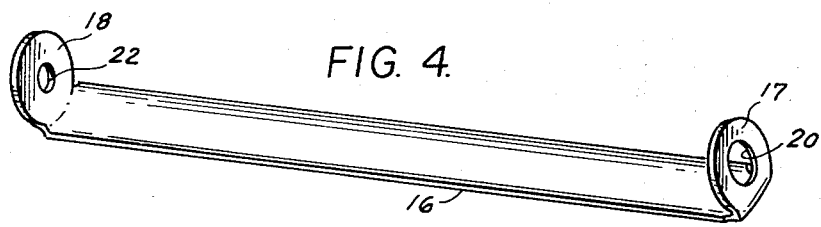
FIG. 4.
INVENTOR.
EUGENE A. SWEE
BY
ATTORNEY United States Patent Office 3,355,582
Patented Nov. 28, 1967

3,355,582
BATTERY POWERED LIGHTING DEVICE
Eugene A. Swee, Bronx, N.Y., assignor to Miner Industries, Inc., New York, N.Y., a corporation of Delaware
Filed Sept. 3, 1965, Ser. No. 484,829
3 Claims. (Cl. 240—10)

ABSTRACT OF THE DISCLOSURE

A battery powered lighting device includes an electrically conductive, elongated frame with ears projecting laterally toward one side at the frame ends, one of the ears having an opening in which a lamp base is secured and the other ear having an opening in which a conductive screw is threadably engaged to make and break an energizing circuit for the bulb through electric storage batteries between the ears, and an open ended sleeve slidably telescoping over the frame and batteries to hold the latter between the ears.

---

This invention relates generally to battery powered lighting devices.

It is an object of this invention to provide a battery powered lighting device of low cost and simple construction that is particularly suited for decorative purposes.

Another object is to provide a battery powered, decorative lighting device with a low cost and reliable arrangement for controlling the energization of a light bulb included therein.

A further object is to provide for the secure mounting of the lighting device, either on a horizontal or vertical supporting surface.

In accordance with this invention, a battery powered lighting device comprises an elongated casing having electrically connected, apertured end walls, a light bulb having its base secured in one of the apertured end walls, one or more dry cell batteries disposed in the casing and having an overall length that is substantially less than the distance from the light bulb base to the other end wall of the casing, and a conducting screw member threaded through the said other end wall so that relative turning of the casing and screw member varies the projection of the latter into the casing for either completing or breaking the energizing circuit for the light bulb.

In a preferred embodiment of the invention, the casing of the lighting device is constituted by an elongated frame member having ears projecting laterally toward one side at the opposite ends of the frame member to form the apertured end walls of the casing, and an open ended sleeve slidably telescoping over the frame member to retain the battery or batteries against the said one side of the frame between the ears of the latter.

In accordance with a feature of the invention, the screw member for controlling the energization of the light bulb extends from a suction cup member by which the lighting device may be mounted on a horizontal or vertical support surface.

The above, and other objects, features and advantages of the invention, will be apparent in the following detailed description of an illustrative embodiment thereof which is to be read in connection with the accompanying drawing, wherein:

FIG. 1 is an elevational view of a lighting device embodying this invention, with a decorative globe or shade of the device being shown broken away and in section;

FIG. 2 is an enlarged axial sectional view of the lighting device;

FIG. 3 is a sectional view taken along the line 3—3 on FIG. 2; and

FIG. 4 is a perspective view of a frame member included in the device.

Referring to the drawing in detail, it will be seen that the illustrated lighting device 10 generally comprises an elongated casing 11 having a light bulb 12 projecting from one end and connected, at its other end, to a suction cup member 13 by which the device 10 may be securely mounted on a horizontal or vertical support surface. The casing 11 is adapted to contain one or more electric, dry cell storage batteries 14 (FIG. 2) for energizing the light bulb 12. The casing 11 may further support a decorative globe or shade 15 which is blow-molded of plastic or otherwise formed and has an opening 16 to receive the casing 11 with a frictional fit therebetween so as to maintain the shade 15 at a desired location on the casing. The globe or shade 15 may be in the form of a jack-o-lantern or other decorative object which is to be illuminated by the bulb 12 therein.

In accordance with this invention, the casing 11 is constituted by an elongated frame member 16 of a conducting metal having circular ears 17 and 18 projecting toward one side of the frame member at the opposite ends of the latter (FIGS. 2 and 4) and by an open-ended sleeve 19 (FIGS. 1 and 2) which is preferably cut from extended plastic tubular stock so as to be electrically insulating. The sleeve 19 is substantially longitudinally coextensive with frame member 16 and is diametrically dimensioned to telescope slidably over the frame member with the batteries 14 cradled in the latter, as shown on FIG. 2.

As is apparent on FIG. 3, frame member 16 is preferably arcuate in transverse cross-section so as to conform to the usual shape of the batteries 14 when the latter are located end-to-end between ears 17 and 18 at one side of the frame member. In the assembled casing 11 (FIG. 2), ears 17 and 18 of frame member 16 form the opposite end walls which substantially close the ends of sleeve 19.

Ear 17 has an opening or aperture 20 (FIG. 4) and may be twisted slightly out of a flat plane so that a threaded base 21 of light bulb 12 can be screwed into aperture 20 and thereby supported at one end of casing 11. As is apparent on FIG. 2, frame member 16 is longitudinally dimensioned so that the distance D from the base 21 of the light bulb fully screwed into aperture 20 of ear 17 to the other ear 18 is substantially greater than the overall length L of the batteries 14. Thus, batteries 14 are loosely received between the light bulb base 21 and the ear 18.

Further, in accordance with this invention, ear 18 has a central aperture or hole 22 (FIG. 4) which is tapped to threadably receive a conducting screw member 23 (FIG. 2). The screw member 23 is embedded, or otherwise secured in the suction cup member 13 so that the engagement of screw member 23 in tapped hole 22 serves to secure casing 11 to the suction cup member. The screw member 23 serves the additional important function of controlling the energization of light bulb 12. Thus, when casing 11 is turned relative to suction cup member 13 in the direction for increasing the projection of screw 23 through ear 18, the batteries 14 are axially clamped between screw 23 and light bulb base 21 to complete the circuit for energizing the light bulb by way of screw 23 and frame member 16. However, when casing 11 and suction cup member 13 are turned relative to each other in the opposite direction so as to decrease the projection of screw 23 through ear 18, contact is broken either between light bulb base 21 and the adjacent battery or between screw 23 and the adjacent battery, thereby to interrupt the circuit for energizing the light bulb.

From the above, it will be apparent that the screw 23 acts as a switch to control the operation of the lighting device 10 and the elimination of a conventional switch for that purpose is an important cost-saving feature of the device. When the batteries 14 are to be replaced, the sleeve 19 is slipped axially off frame member 16 in the direction away from suction cup member 13 to permit the lateral removal of the used batteries from their cradled positions between ears 17 and 18.

Although an illustrative embodiment of the invention has been described in detail herein with reference to the accompanying drawing, it is to be understood that the invention is not limited to that precise embodiment, and that various changes and modifications may be effected therein by one skilled in the art without departing from the scope or spirit of the invention as defined in the appended claims.

What is claimed is:

1. A battery powered lighting device comprising an elongated frame member having electrically connected, apertured ears projecting laterally toward one side at the opposite ends of the frame member, a light bulb having a base secured in one of said apertured ears, electric storage battery means disposed at said one side of the frame member between said ears, the distance between said base of the light bulb and the other of said ears being greater than the length of said battery means, an open ended sleeve slidably telescoping over said frame member and being substantially longitudinally coextensive with the latter to retain said battery means between said ears, and a conducting screw member threaded through said other apertured ear so that returning of said frame member relative to said screw member varies the projection of the latter through said other ear for making and breaking an energizing circuit for the light bulb.

2. A battery powered lighting device comprising an elongated frame member of electrically conducting material having ears projecting laterally toward one side thereof at the opposite ends of said frame member, each of said ears having an opening therein, a light bulb having a base secured in said opening of one of said ears, said frame member being longitudinally dimensioned to receive dry cell battery means at said one side loosely between said base of the light bulb secured in said one ear and said other ear, an open-ended sleeve member slidably telescoping over said frame member for retaining the battery means against the frame member, and a suction cup member having a conducting screw extending therefrom and being threadably engaged in said opening of the other ear for supporting the lighting device, turning of said frame member relative to said suction cup member being effective to vary the projection of said screw through said other ear for making and breaking an energizing circuit for said light bulb.

3. A battery powered lighting device as in claim 2; further comprising a decorative shade having an opening dimensioned to receive said sleeve with a friction fit therebetween so as to maintain said shade on said sleeve with said light bulb located within the shade.

References Cited
UNITED STATES PATENTS

| | | |
|---|---|---|
| 1,641,880 | 9/1927 | Cohen. |
| 1,916,472 | 7/1933 | Ferris et al. _____ 240—10.64 |
| 2,180,228 | 11/1939 | Florman _____ 240—10.68 |
| 2,522,660 | 9/1950 | Bledsoe _____ 240—10.61 XR |
| 2,849,601 | 9/1958 | Walzer _____ 240—52.2 |

NORTON ANSHER, *Primary Examiner.*